(No Model.) 2 Sheets—Sheet 1.
R. SPRINGBORN.
INSTRUCTING DEVICE.
No. 605,144. Patented June 7, 1898.
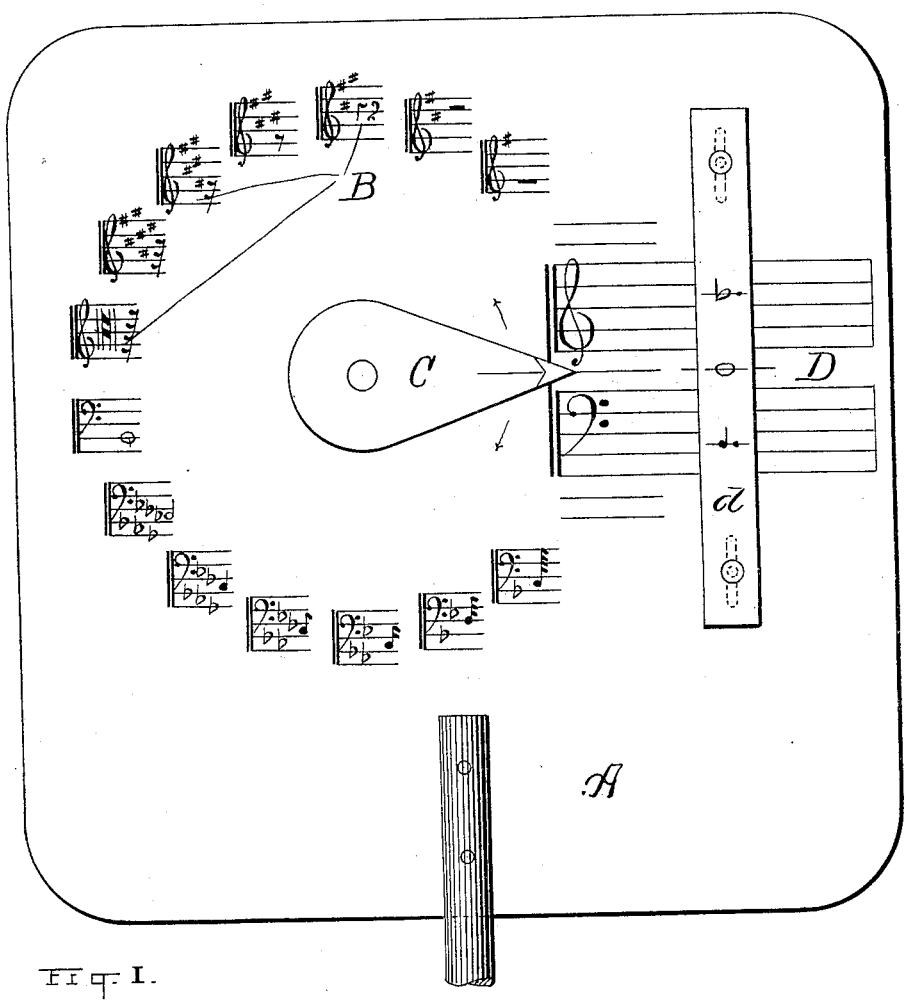
Fig. I.
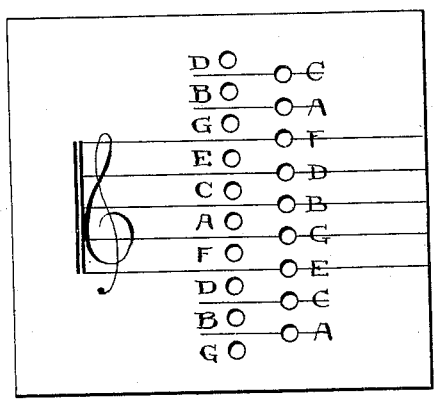
Fig. VI.
WITNESSES
David D. Davies
R. E. Merkel
INVENTOR
R. Springborn
By Hall & Fay ATTYS.

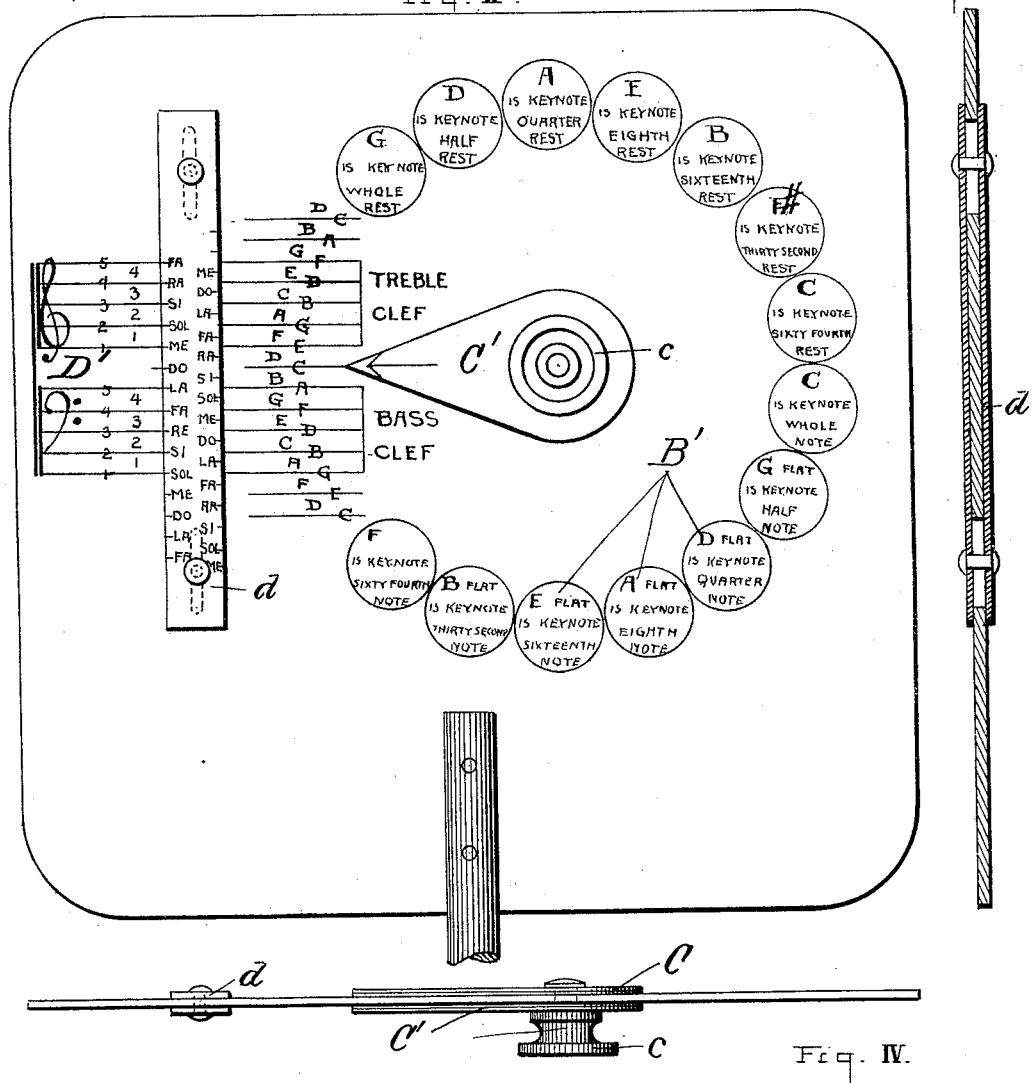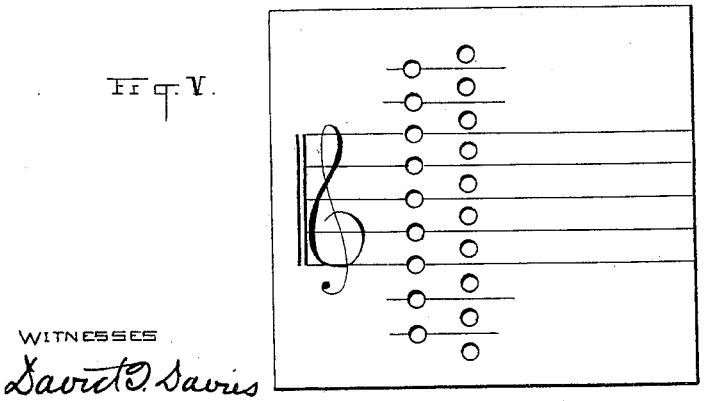

UNITED STATES PATENT OFFICE.

RICHARD SPRINGBORN, OF CLEVELAND, OHIO.

INSTRUCTING DEVICE.

SPECIFICATION forming part of Letters Patent No. 605,144, dated June 7, 1898.

Application filed June 23, 1897. Serial No. 641,883. (No model.)

*To all whom it may concern:*

Be it known that I, RICHARD SPRINGBORN, a citizen of the United States, and a resident of Cleveland, county of Cuyahoga, and State of Ohio, have invented a new and useful Improvement in Instructing Devices, of which the following is a specification, the principle of the invention being herein explained and the best mode in which I have contemplated applying that principle, so as to distinguish it from other inventions.

The annexed drawings and the following description set forth in detail certain mechanism embodying the invention, such disclosed means constituting but one of various mechanical forms in which the principle of the invention may be used.

In said annexed drawings, Figure I represents a view of one side of my improved instructor as particularly arranged for the instruction of music. Fig. II represents the opposite side. Fig. III represents a vertical central transverse cross-sectional view thereof; Fig. IV, a horizontal longitudinal central view, and Figs. V and VI the two sides of a simple form of the musical instructor.

My improved instructor, as illustrated in Figs. I, II, III, and IV, as applied to the instruction of musical science consists of a sheet A, having printed or otherwise indicated on one side a system of questions or queries occurring in said science, which questions or queries consist of a series of musical characters representing all the different positions which those characters may be given on a musical staff. For instance, I have grouped together in a series of groups B the sharps or flats denoting a certain key in the treble or bass scale indicated by the treble or bass clef, together with one of the various notes or rests used in music. These groups B are arranged for convenience and symmetry in a circle, whereby they may be conveniently pointed to by a pointer C, pivoted at the center of said circle. At one side I have provided a treble and bass staff D, also located within the range of the said pointer C. On the opposite side of said sheet I have arranged in similar groups B' the character or words in Roman letters, whereby a person unfamiliar with the names of the characters on the other side may answer a query or question put to him relative to said characters. A second indicator or pointer C', directly connected with the pointer C, points to said answers and may be manipulated by a thumb-piece c. The indicator is so arranged that it points to a musical character on one side and to characters or words on the other side whereby he may know the designation thereof—that is, if the indicator be made to indicate a question on one side the other indicator will indicate to him the answer on the opposite side.

For convenience and to economize space I arrange the questions and answers directly opposite each other. A second treble and bass staff D' is provided opposite the staves D, which staves have printed or indicated thereon the names of the various notes in their respective positions. It is thus seen that the operator may point with the indicator at a line or space on one side, the said action constituting or taking the form of a question to the learner, and he may have before him the answer to said question. I have in addition arranged a do-re-mi scale on a sliding piece *d*, one side being known and the other unknown, whereby the position of said names may be changed to correspond with the respective keys in which questions are being asked.

In Figs. V and VI, I have shown a single staff, which is perforated on the lettered lines and spaces, which perforations are located in corresponding positions on a staff on the opposite side of the sheet without letters. The questions may be asked by protruding a pencil or other implement through the said perforations.

It is thus seen that a person of very limited musical knowledge may constitute himself an effective teacher of music.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In an instructing device, the combination with a plane or sheet having on one face a series of questions and on the opposite face a series of answers corresponding to said questions, of means for coincidently indicating a question and an answer, substantially as set forth.

2. In an instructing device, the combination with a plane or sheet having two faces, said faces so disposed that but one is visible to a beholder at one time, one of said faces provided with a series of questions, the other of said faces provided with a series of answers corresponding to said questions, of an indicator for coincidently indicating a question and its corresponding answer, substantially as set forth.

3. In an instructing device, the combination with two faces oppositely disposed, one of said faces provided with a series of questions and the other with a series of answers corresponding with said questions, of a double pointer one portion of which is adapted to point to a question on one of said sides and the other portion adapted to point to its corresponding answer on the other side, substantially as set forth.

Signed by me this 21st day of June, 1897.

RICHARD SPRINGBORN.

Attested by—
  DAVID T. DAVIES,
  A. E. MERKEL.